United States Patent [19]

Satoh et al.

[11] Patent Number: 4,825,832

[45] Date of Patent: May 2, 1989

[54] SYSTEM AND METHOD FOR CONTROLLING AN IGNITION TIMING FOR AN INTERNAL COMBUSTION ENGINE

[75] Inventors: Hiroshi Satoh, Stanford, Calif.; Toshimi Abo, Kanagawa, Japan

[73] Assignee: Nissan Motor Company, Limited, Japan

[21] Appl. No.: 183,715

[22] Filed: Apr. 19, 1988

[30] Foreign Application Priority Data

Jun. 1, 1987 [JP] Japan ................. 62-138805

[51] Int. Cl.$^4$ ............................. F02P 5/14
[52] U.S. Cl. ................. 123/425; 123/417; 123/435
[58] Field of Search ............ 123/425, 416, 417, 406, 123/435

[56] References Cited

U.S. PATENT DOCUMENTS

| | | |
|---|---|---|
| 4,660,535 | 4/1987 | Asano . |
| 4,676,212 | 6/1987 | Kashimura et al. ............... 123/425 |
| 4,690,116 | 9/1987 | Takahishi ........................ 123/425 |
| 4,693,221 | 9/1987 | Nakajima et al. ................. 123/425 |
| 4,694,799 | 9/1987 | Yagi et al. ...................... 123/425 |
| 4,694,800 | 9/1987 | Morita ........................... 123/425 |
| 4,711,215 | 12/1987 | Cinpioski ........................ 123/425 |
| 4,727,842 | 3/1988 | Takahashi . |
| 4,729,358 | 3/1988 | Morita et al. ................... 123/425 |
| 4,741,310 | 5/1988 | Yagi et al. ...................... 123/425 |
| 4,745,902 | 5/1988 | Yagi et al. ...................... 123/425 |
| 4,748,952 | 6/1988 | Yagi et al. ...................... 123/425 |
| 4,774,922 | 10/1988 | Morita . |
| 4,785,783 | 11/1988 | Oshiage et al. . |

FOREIGN PATENT DOCUMENTS

| | | | |
|---|---|---|---|
| 54-116525 | 9/1979 | Japan .............. | 123/425 |
| 58-82074 | 5/1983 | Japan .............. | 123/425 |

Primary Examiner—Raymond A. Nelli
Attorney, Agent, or Firm—Lowe, Price, LeBlanc, Becker & Shur

[57] ABSTRACT

A system and method for controlling an ignition timing for an internal combustion engine, in which one of knock suppression correction quantity and MBT (Maximum Spark Advance for Best Torque) correction quantity whose value is placed at a more retardation angle side is selected as the ignition timing correction quantity, the ignition timing angle correction quantity is compared with the knock suppression quantity when a magnitude of the engine knocking exceeds a predetermined level. When the knock suppression correction quantity is placed at a more advance angle side than the ignition timing correction quantity, a basic ignition timing angle determined on the basis of an engine operating condition is corrected on the basis of a value of the ignition timing correction quantity corrected toward the retardation angle side by a predetermined angle. When the knock suppression correction quantity is not placed at the more advance angle side, the basic ignition timing angle is corrected on the basis of the knock suppression correction quantity.

12 Claims, 10 Drawing Sheets

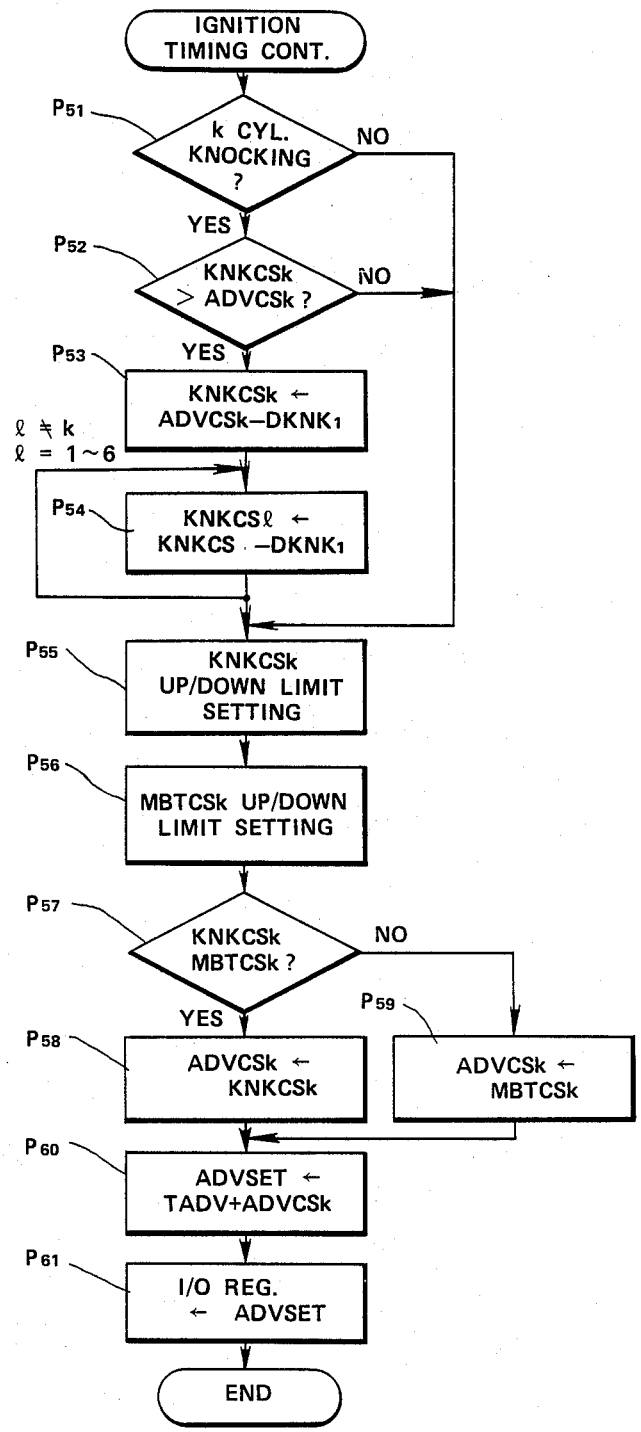

SYSTEM AND METHOD FOR CONTROLLING AN IGNITION TIMING FOR AN INTERNAL COMBUSTION ENGINE

BACKGROUND OF THE INVENTION (1) Field of the Invention

The present invention relates to a system and method for controllig an ignition timing for an internal combustion engine. More specifically, the present invention relates to the system and method therefor, in which an engine knocking is suppressed and an MBT (Minimum Spark Advance For Best Torque) control is carried out so that an engine driveability is increased.

(2) Background of the Art

It is necessary to determine an ignition timing of an internal combustion engine according to an engine operating condition so that the engine is driven at optimum.

In general, it is a best way to ignite fuel supplied to the engine at a timing in a vicinity of a miniumum advance angle while achieving a maximum engine torque, so called MBT, with an efficiency and fuel consumption of the engine taken into account. An MBT control such that the ignition timing is changed to MBT according to the engine operating condition has been carried out in almost engines.

However, an engine knocking occurs in a certain engine operating condition and a stable engine driving cannot be achieved.

A Japanese Patent Application First (Unexamined) Publication No. sho 58-82074 published on May 17, 1983 and U.S. Pat. No. 4,640,249 issued on Feb. 3, 1987 exemplifies the ignition timing controlling systems, in which a knocking control operation for controlling the ignition timing according to a presence or absence of the engine knocking is carried out in combination with the above-described MBT control operation.

In the ignition timing controlling systems disclosed in the above-identified Japanese Patent Application Publication and United States Patent, a pressure in a combustion chamber of an engine cylinder(s) (hereinafter referred to as an internal cylinder pressure) is detected and the ignition timing is controlled in the MBT control mode in such a way that a crank angle at which the internal cylinder pressure becomes maximum (hereinafter referred to as an internal cylinder pressure maximum timing) $\theta_{pmax}$ is placed at a predetermined angular position at which a magnitude of a generation torque of the engine becomes maximum. In addition, at the same time, the engine knocking is detected by means of a signal processing circuit on the basis of the detected signal of the internal cylinder pressure. When the knocking level exceeds a predetermined value, the ignition timing is controlled toward a retardation angle side to avoid recurrence of the engine knocking with a higher priority than the MBT control. Furthermore, when the knocking has been suppressed, the ignition timing is again controlled in the MBT control mode so that the magnitude of the engine generation torque becomes maximum. In this way, the magnitude of engine generation torque is made as large as possible with the suppression of the engine knocking recurrence so that the engine driveability is improved.

However, in the ignition timing controlling system in the above-identified Japanese Patent Application Publication, whenever the knocking occurs, the knocking suppressive control is uniformly carried out with the higher priority than the MBT control. On the other hand, when the knocking does not occur, the MBT control causes the ignition timing to be corrected. When the knocking occurs, a correction angle quantity in the MBT control mode is fixed and the ignition timing is corrected to retard the ignition timing. Therefore, since in a case when the engine knocking has not occurred after the correction of the ignition timing toward the retardation angle side by means of the knocking control under some engine operating condition, the correction of the ignition timing toward an advance angle side is immediately executed by means of MBT control and thus an effect of avoiding the recurrence of the engine knocking is often lost.

To avoid such an situation as described above, if the MBT control is fixed for a predetermined interval of time after the occurrence of knocking and the engine operating condition abruptly changes, an angular point of the MBT control is placed at the more retardation angle side. In this situation, a responsive characteristic of the MBT control is worsened and the effect of increasing the engine generation of the knocking generation a strong knocking such as to cause an engine breakage often appears.

Therefore, in order to eliminate such a strong knocking as described above at the initial stage of knocking generation, it becomes necessary to increase the effect of suppressing the recurrence of knocking in the knocking suppressive control at an earlier stage of the knocking occurrence.

SUMMARY OF THE INVENTION

It is, therefore, an object of the present invention to provide a system and method for controlling an ignition timing for an internal combustion engine which improve a fuel consumption and engine driveability at times of transient engine operating conditions.

It is another object of the present invention to provide the system and method therefor which achieve a speedy elimination of an engine knocking at an initial stage of the engine knocking occurrence and effectively achieve an MBT control within a range of the ignition timing in which no knocking occurs, avoiding the recurrence of the engine knocking underall engine operating conditions so that a maximum engine torque generation can be assured under each engine operating condition.

It is still another object of the present invention to provide the system and method therefor in which the ignition timing angle at the more retardation angle side is selected as the correction quantity of the ignition timing from among the correction quantity for preventing the recurrence of knocking and that for the MBT and a basic ignition timing determined on the basis of the instantaneous engine operating condition is corrected on the basis of a value of the ignition timing correction quantity corrected toward the retardation angle side by a predetermined value when the correction quantity for preventing the recurrence of knocking is placed at a relatively advance angle side as compared with the present ignition timing correction quantity.

The above-described objects can be achieved by providing a system for controlling an ignition timing for an internal combustion engine, comprising: (a) first means for detecting occurrence of engine knocking; (b) second means for detecting an internal pressure in an engine cylinder; (c) third means for detecting an engine operating condition; (d) fourth means for setting a basic ignition timing according to the engine operating condition; (e) fifth means for detecting a crankshaft angular displacement at which the internal cylinder pressure becomes maximum as a maximum internal cylinder timing on the basis of a detection result of the second means; (f) sixth means for calculating a knock correction quantity for correcting the instantaneous ignition timing so as to suppress the knocking at a predetermined level on the basis of a detection result of the first means; (g) seventh means for calculating an MBT correction quantity for correcting the instantaneous ignition timing so that the maximum internal cylinder pressure timing coincides with a target position at which a generation of engine output torque becomes maximum ; (h) eighth means for selecting one of the knock and MBT correction quantities whose value is smaller than the other correction quantities as an ignition timing correction quantity; (i) ninth means for correcting the basic ignition timing on the basis of the instantaneous ignition timing correction quantity selected by the eighth means; (j) tenth means for comparing the instantaneous knock correction quantity with a previous ignition timing correction quantity and correcting the instantaneous knock correction quantity toward a retardation angle side by a predetermined value when a magnitude of the engine knocking exceeds the predetermined level and when the instantaneous knock correction quantity is larger than the previous ignition timing correction; and (h) eleventh means for determining the instantaneous ignition timing from the corrected basic ignition timing by the ninth means and igniting fuel supplied to the engine at the determined ignition timing.

The above-described objects can also be achieved by providing a system for controlling an ignition timing for an internal combustion engine, comprising: (a) first means detecting an occurrence of engine knocking; (b) second means for detecting an internal pressure in an engine cylinder of the engine; (c) third means for calculating a knock correction quantity for correcting the ignition timing so as to suppress the knocking at a predetermined level on the basis of a detection result of the first means; (d) fourth means for detecting a crank angle at which the internal pressure becomes maximum as the maximum internal pressure timing on the basis of a detection result of the second means; (e) fifth means for calculating an MBT correction quantity for correcting the ignition timing so that the maximum internal cylinder pressure timing coincides with a target position at which a generation of engine torque becomes maximum; (f) sixth means for detecting an engine operating condition; (g) seventh means for setting a basic ignition timing angle on the basis of the engine operating condition detected by the sixth means; (h) eighth means for selecting one of the knock correction quantity and MBT correction quantity which is placed at a more retardation angle side as an ignition timing correction quantity; (i) ninth means for correcting the basic timing angle according to the MBT correction quantity, comparing the ignition timing correction quantity selected by the eighth means with the knock correction quantity when the first means detects that the magnitude of the engine knocking exceeds the predetermined level, correcting the basic ignition timing on the basis of a value corrected toward the retardation angle side by a predetermined value when the knock correction quantity is placed at a more advance angle side than the correction quantity of the ignition timing, and correcting the basic ignition timing angle on the basis of the knock correction quantity when the knock correction quantity is not placed at the more advance angle side than the ignition timing correction quantity; and (j) tenth means for igniting fuel supplied to each engine cylinder at a timing determined by the ninth means.

The above-described objects can also be achieved by providing a system for controlling an ignition timing for an internal combustion engine, comprising: (a) first means for detecting an occurrence of engine knocking; (b) second means for detecting an internal pressure in an engine cylinder of the engine; (c) third means for detecting an engine operating condition; (d) fourth means for setting a basic ignition timing according to the engine operating condition; (e) fifth means for detecting a crankshaft angular displacement at which the internal cylinder pressure becomes maximum as a maximum internal cylinder timing on the basis of a detection result of the second means; (f) sixth means for calculating a knock correction quantity for correcting the instantaneous ignition timing so as to suppress the knocking at a predetermined level on the basis of a detection result of the first means; (g) seventh means for calculating an MBT correction quantity for correcting the instantaneous ignition timing so that the maximum internal cylinder pressure timing coincides with a target position at which a magnitude of the engine output torque becomes maximum; (h) eighth means for selecting one of the knock and MBT correction quantities whose value is smaller than the other one as an ignition timing correction quantity; (i) ninth means for correcting the basic ignition timing on the basis of the instantaneous ignition timing correction quantity selected by the eighth means; and (j) tenth means for igniting fuel supplied to the engine at a timing of the basic ignition timing corrected by the instantaneous ignition timing correction quantity corrected by the ninth means.

The above-described objects can also be achieved by providing a method for controlling an ignition timing for an internal combustion engine, comprising the steps of: (a) detecting an occurrence of engine knocking; (b) detecting an internal pressure in an engine cylinder of the engine; (c) detecting an engine operating condition; (d) setting a basic ignition detecting a crankshaft angular displacement at which the internal cylinder pressure becomes maximum as a maximum internal cylinder timing on the basis of the detection result in the step (b); (f) calculating a knock correction quantity for correcting the instantaneous ignition timing so as to suppress the engine knocking at a predetermined level on the basis of a detection result of the step (a); (g) calculating an MBT correction quantity for correcting the instantaneous ignition timing so that the maximum internal cylinder pressure timing coincides with a target position at which a magnitude of an engine output torque becomes maximum; (h) selecting one of both knock and MBT correction quantities whose value is smaller than the other one as an ignition timing correction quantity; (i) correcting the basic ignition timing on the basis of the instantaneous ignition timing correction quantity selected in the step (h); (j) comparing the instantaneous knock correction quantity with a previous ignition timing correction quantity; (k) correcting the instantaneous knock correction quantity toward a retardation angle side by a predetermined value when the magnitude of the engine knocking exceeds the predetermined level and when the instantaneous knock correction quantity is larger than the previous ignition timing correction quantity; and (1) determining the instantaneous ignition timing from the corrected basic ignition timing carried out in the step (i) and igniting fuel supplied to the engine at the determined ignition timing.

BRIEF DESCRIPTION OF THE DRAWINGS

FIG. 13 is a processing flowchart of the engine ignition timing control executed in the system shown in FIG. 10.

DETAILED DESCRIPTION OF THE PREFERRED EMBODIMENTS

Reference will hereinafter be made of the drawings in order to facilitate understanding of the present invention.

FIGS. 1 to 9 show a first preferred embodiment of an engine ignition timing controlling system according to the present invention.

Figure 1:
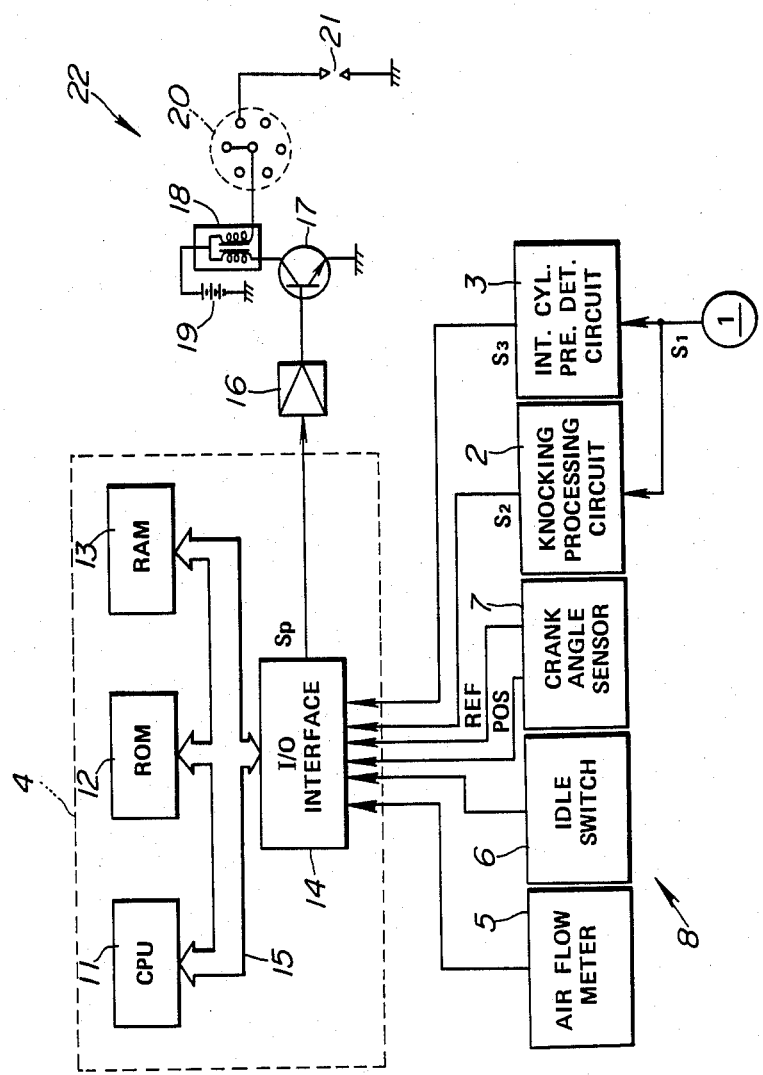
FIG. 1 is a schematic circuit diagram of a system for controlling an ignition timing for an internal combustion engine in a first preferred embodiment according to the present invention.

FIG. 1 shows a whole construction of the engine ignition timing controlling system in the first preferred embodiment.

In FIG. 1, a internal pressure responsive sensor 1 converts a combustion pressure in a cylinder into an electric charge by means of a piezoelectric element thereof and outputs an electric charge signal $S_1$ according to the combustion pressure. The internal pressure responsive sensor 1 is specifically formed of a washer of an ignition plug screwed to a cylinder head of the engine. The washer shaped internal pressure responsive sensor 1 is fixed to the ignition plug and cylinder head by means of a fastening portion of the ignition plug. The output signal of the internal cylinder head by means of a fastening portion of the ignition plug. The output signal of the internal cylinder pressure responsive sensor 1 is inputted to a knocking processing circuit 2 and internal cylinder pressure detecting circuit 3. The knocking processing circuit 2 includes a band pass filter enabling a passage of only high frequency components of the pressure indicative signal $S_1$ which are predominantly included in the signal $S_1$ from the internal pressure responsive sensor 1 and a wave shaping circuit half-wave rectifying the high frequency components, forming an envelope signal from the half-wave rectified signal, and outputting a knocking signal $S_2$ corresponding to the knocking level.

The internal cylinder pressure detecting circuit 3 includes a charge amplifier and a low-pass filter. The output signal $S_1$ of the internal cylinder pressure sensor 1 is electric charge-voltage converted by means of the charge amplifier to provide the electrical signal. The low-pass filter extracts signal components only below a predetermined offset frequency (e.g., about 1 kHz) from the voltage signal to eliminate the high frequency components and outputs a signal $S_3$ to be processed to a control unit 4.

The structures of the knocking signal processing circuit 2 and internal cylinder detecting circuit 3 are exemplified by a U.S. patent application Ser. No. 749,478 filed on Jan. 27, 1985 and U.S. Pat. No. 4,640,249 issued on Feb. 3, 1987, the disclosures of which are hereby incorporated by reference.

An airflow quantity $Q_a$ of the intake air is detected by an airflow meter 5. An engine idling state is detected by means of an idle switch 6 installed at a throttle valve of the engine. In addition, an engine revolutional angle, i.e., a crank angle of the engine is detected by means of a crank angle sensor 7. The crank angle sensor 7 outputs a reference signal REF of a pulse when a predetermined position, e.g., BTDC 70° before an upper dead center in an explosion stroke of each engine cyliner for each explosion stroke (120 degrees in the case of a six-cylinder engine and 180 degrees in the case of a four-cylinder engine) and outputs a unit angular signal POS whenever the engine revolves through a unit angle, e.g., 1°. The engine revolutional speed N is detected by means of the crank angle sensor 7. The airflow meter 5 and crank angle sensor 7 constitute engine driving state detecting means 8. The engine driving state detecting means 8 and idle switch 6 output signals to the control unit 4. The control unit 4 carries out the ignition timing control on the basis of these input informations. The control unit 4 includes a CPU (Central Processing Unit) 11, ROM (Read Only Memory) 12, RAM (Random Access Memory) 13, and an I/O interface 14. These circuits elements are interconnected via a common bus 15. The I/O interface 14 receives signals from the respective sensors and outputs an ignition signal $S_P$ to a power transistor 17 via an amplifier 16. When the amplified ignition signal is received at a base of the power transistor 17 (in the case of FIG. 1, when the power supply to the power transistor is interrupted), the power transistor 17 is turned off so that a primary current to an ignition coil 18 is interrupted from a battery 19 so that a high surge pulse Pi is generated. The high surge pulse Pi is supplied an distributed to the ignition plug 21 of each cylinder. The output signal amplifier 16, power transistor 17, ignition coil 18, battery 19, distributor 20, and ignition plug 21 constitute ignition means 22.

An operation of the first preferred embodiment will be described.

Figure 2:
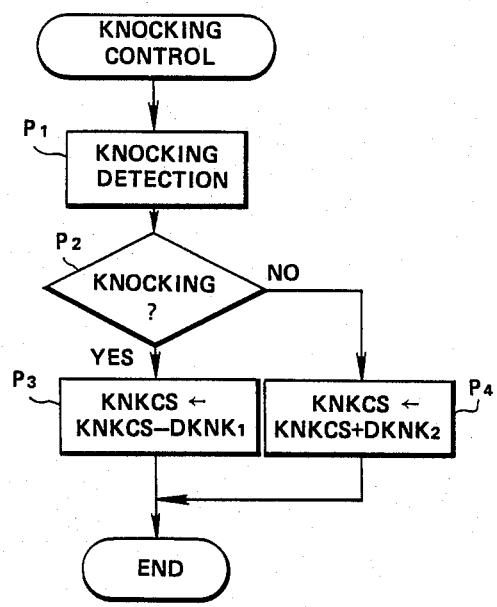
FIG. 2 is a processing flowchart of a knocking control executed in the system shown in FIG. 1.

First, FIG. 2 shows a program flowchart executed in the control unit 4 for a knocking control. The program shown in FIG. 2 is executed for each predetermined interval of time.

In a step $P_1$, the control unit 4 detects an occurrence of the engine knocking.

Specifically, on the basis of data derived by processing the output signal $S_2$ of the knocking processing circuit 2, the occurrence of knocking is detected by means of a knocking signal processing program (not shown) activated at a predetermined crank angle position having the same period as the reference signal period. In the knocking signal processing program, an activation flag is set whenever it is activated. When the activation flag is set, the control unit 4 determines the occurrence of knocking. The activation flag is cleared. Furthermore, when the activation flag is cleared, the control unit 4 determines that no knocking occurs. It is noted that the knocking detecting method is exemplified by a Japanese Patent Application First (Unexamined) Publication No. sho 54-116525 published on Sept. 10, 1979, other Japanese Patent Application Publications and U.S. Pat. Nos. 4,660,249 issued on Apr. 28, 1987 and 4,640,249 issued on Feb. 3, 1987. The disclosures of the two United States Patents are hereby incorporated by reference.

Next in a step $P_2$, the control unit 4 determines whether the engine knocking occurs.

When the knocking occurs (Yes), the routine goes to a step $P_3$ in which a knock correction quantity KNKCS is corrected to a retardation angle side by a predetermined angle $DKNK_1$ in accordance with an equation (1). When no knocking occurs, the routine goes to a step $P_4$ in which the knock correction quantity KNKCS is corrected toward an advance angle side by a predetermined angle $DKNK_2$ in accordance with an equation (2).

$$KNKCS = KNKCS' - DKNK_1 \quad (1)$$

$$KNKCS = KNKCS' + DKNK_2 \quad (2)$$

In the two equations (1) and (2), KNKCS′ = a previous value of KNKCS.

Figure 3:
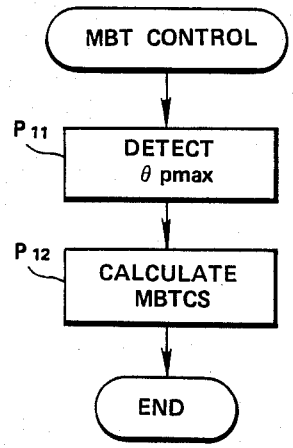
FIG. 3 is a processing flowchart of an MBT control executed in the system shown in FIG. 1.

FIG. 3 shows a flowchart of a program of an MBT (Minimum Spark Advance for Best Torque) control. This program is activated at the same period as that of the reference signal REF.

In FIG. 3, in a step $P_{11}$, the control unit 4 detects a crank angle (internal cylinder pressure maximum timing $\theta_{pmax}$) at a time when the internal cylinder pressure signal reaches the maximum value from the data group processed (A/D conversion) for each unit angle on the basis of the signal $S_3$ of the internal pressure detecting circuit 3. In a step $P_{12}$, the control unit 4 calculates an MBT correction quantity MBTCS in accordance with an equation (3) and the routine is ended.

It is noted that the detection of $\theta_{pmax}$ is exemplified by U.S. Pat. No. 4,660,535 and U.S. Pat. No. 4,640,249 exemplify the MBT control procedures, both of disclosures of which are hereby incorporated by reference.

$$MBTCS = MBTCS' + K(\theta_{pmax} - \theta) \quad (3)$$

In the equation (3), MBTCS′: previous value of MBTCS once before the present processing, K: a constant number below one (constant fragment number), and $\theta$: a target position of the MBT control (a crank angle at which the engine generation torque becomes maximum, for example, the crank angle is set to a predetermined value in a range from ATDC 10 degrees to 20 degrees).

Figure 4:
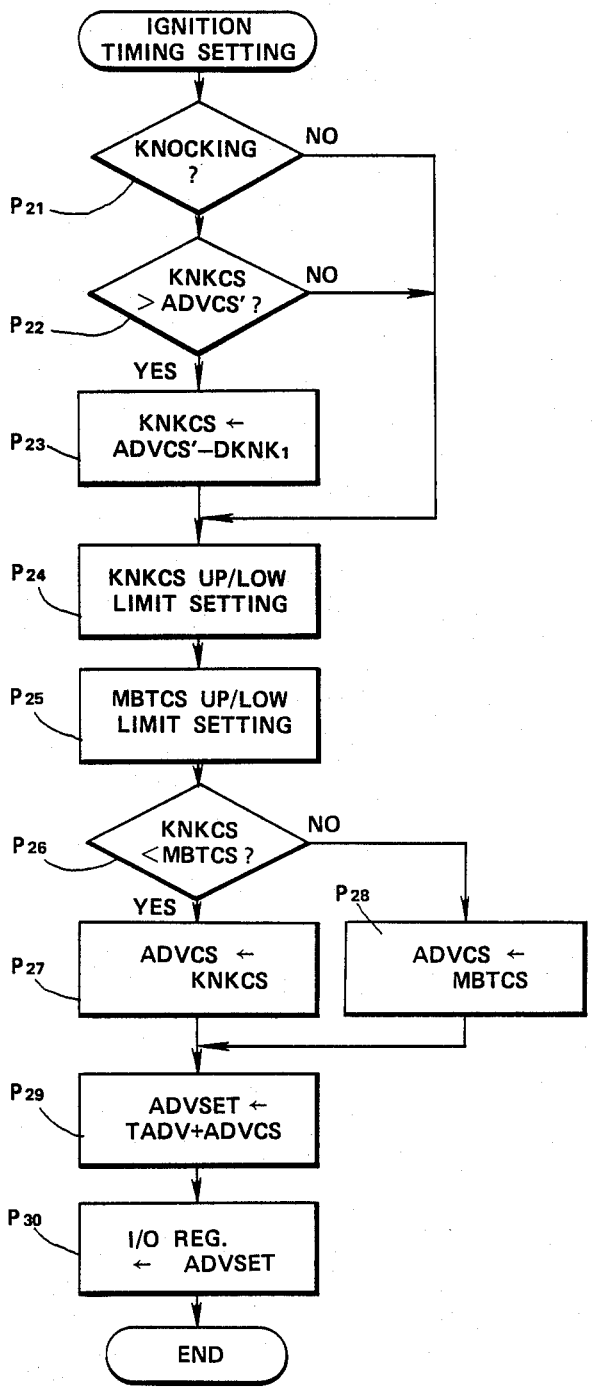
FIG. 4 is a processing flowchart of an ignition timing control executed in the system shown in FIG. 1.

FIG. 4 shows a flowchart of a program of an ignition timing control procedure. The program shown in FIG. 4 is executed once for each predetermined interval of time in synchronization with the reference signal REF.

In a step $P_{21}$, the control unit 4 determines whether the engine knocking has occurred.

At the time of occurrence of the engine knocking, the routine goes to a step $P_{22}$ in which the previous ignition timing correction quantity ADVCS′ is compared with the correction quantity for preventing the recurrence of knocking KNKCS. If the knock correction quantity KNKCS is placed at a more retardation angle side than the previous ignition timing correction quantity ADVCS′, (KNKCS > ADVCS′) the routine goes to a step $P_{23}$ in which the control unit 4 determines that the present stage is an initial stage of the occurrence of knocking and a speedy knocking suppression is required and the control unit 4 replaces the knock correction quantity KNKCS with a value of the previous ignition timing correction quantity ADVCS′ which is corrected to the retardation angle side by the predetermined angle $DKNK_1$ as expressed below.

$$KNKCS = ADVCS' - DKNK_1 \quad (4)$$

On the other hand, the routine goes to a step $P_{24}$, jumping over the step $P_{23}$, if the control unit 4 determines that the occurrence of knocking is absent in the step $P_{21}$ or determines that KNKCS < or = ADVCS′ in the step $P_{22}$ since no replacement of the knock correction quantity is carried out.

In the step $P_{24}$, the control unit 4 sets upper and lower limits for the knock correction quantity KNKCS calculated in the knock controlling program shown in FIG. 2.

In a step $P_{25}$, upper and lower limits are set for the MBT correction quantity MBTCS calculated in the MBT control program shown in FIG. 3. It is noted that the upper limit of the knock correction quantity KNKCS and MBT correction quantity MBTCS (i.e., the correction limit toward the advance angle side) and the lower limit thereof (i.e., the correction limit toward the retardation angle side) have mutually the same values.

Next, in a step $P_{26}$, the control unit 4 compares a magnitude of KNKCS with that of MBTCS. If KNKCS < MBTCS (Yes) in the step $P_{26}$, the routine goes to a step $P_{27}$ in which KNKCS is stored as a new ignition timing correction quantity ADVCS. If KNKCS > MBTCS, the routine goes to a step $P_{28}$ in which MBTCS is stored as ADVCS.

In a step $P_{29}$, the control unit 4 calculates an actual ignition timing setting value (final ignition timing) ADVSET in accordance with the following equation (5). In a step $P_{30}$, (70° − ADVSET) is set in a register of an I/O interface 14 on the basis of the ADVSET.

The ignition signal $S_p$ is outputted at a predetermined ignition timing and the present processing has been ended.

$$ADVSET = TADV + ADVCS \quad (5)$$

In the equation (5), TADV denotes a basic ignition timing (TADV is looked up from a map representing ignition timing advance angles determined on the basis of input values of the engine revolution speed N, intake air quantity $Q_a$, cooling water temperature $T_w$).

In the way described above, the knock correction quantity KNKCS for preventing the recurrence of the knock and MBT correction quantity MBTCS are mutually calculated independently of each other. Then, one of both knock correction quantity KNKCS and MBT correction quantity MBTCS which is placed at a more retardation angle side is selected as the ignition timing correction quantity ADVCS. When the occurrence level of the knocking is above the predetermined value and the knocking correction quantity KNKCS is placed at a more advance angle side than the previous ignition timing quantity ADVCS', the basic ignition timing TADV is corrected on the basis of a value (ADVCS'−DKNK$_1$) of the ignition timing correction quantity ADVCS' corrected toward the retardation angle side by the predetermined value when the magnitude of the knocking is above the predetermined level and the knocking correction quantity KNKCS is placed at a more advance angle side than the previous ignition timing correction quantity ADVCS'.

Hence, the control of knocking suppression is always effectively achieved under all engine operating conditions and the MBT control can effectively be achieved in the range of no knocking occurrence. In addition, the MBT control operation can be achieved without occurrence of the knock at a time of a transient engine operating state. Consequently, it becomes possible to execute the maximum torque driving under each engine operating condition. The engine driveability can be achieved with the improvement in fuel consumption and the operating performance at the time of the transient engine operating state.

The effects achieved in the first preferred embodiment will be described with reference to FIGS. 5 to 9.

Figure 5:
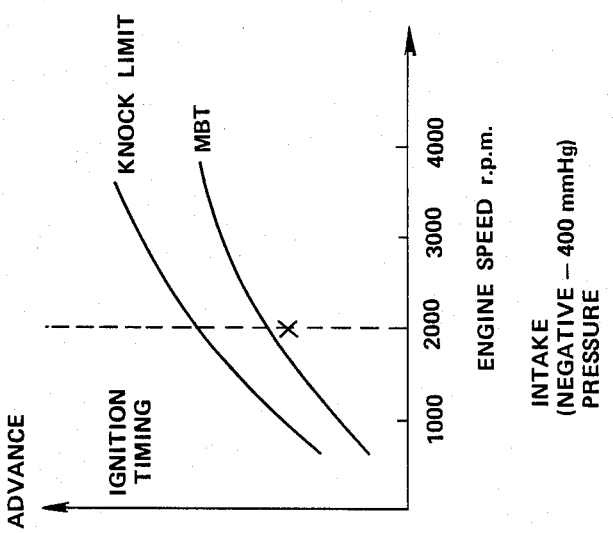
FIG. 5 is a characteristic graph representing a relationship between the MBT controlled ignition timing when an intake negative pressure in an intake air passage indicates −400 mmHg and the ignition timing at a knock limit point.
Figure 8:
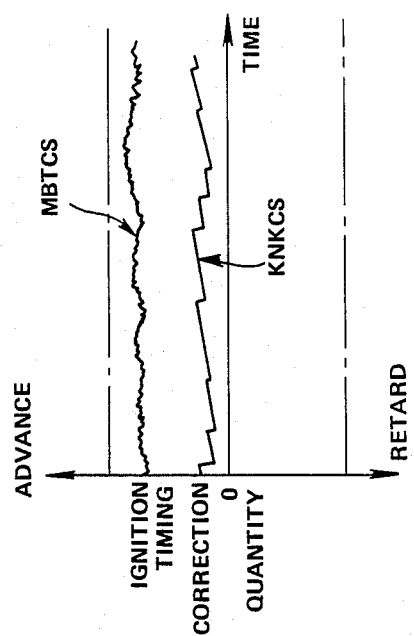
FIGS. 7 and 8 are timing charts indicating movements of the knocking correction quantity and MBT correction quantity.
Figure 7:
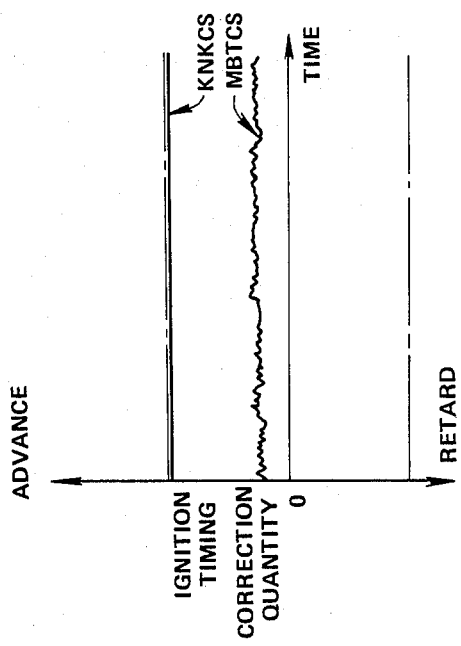

FIGS. 5 and 7 show relationships of the engine revolution speed-versus-MBT ignition timing and the knocking limit timing when the intake negative pressure is constant in the same engine. The intake negative pressures are −400 mmHg and −40 mmHg, respectively.

Figure 9:
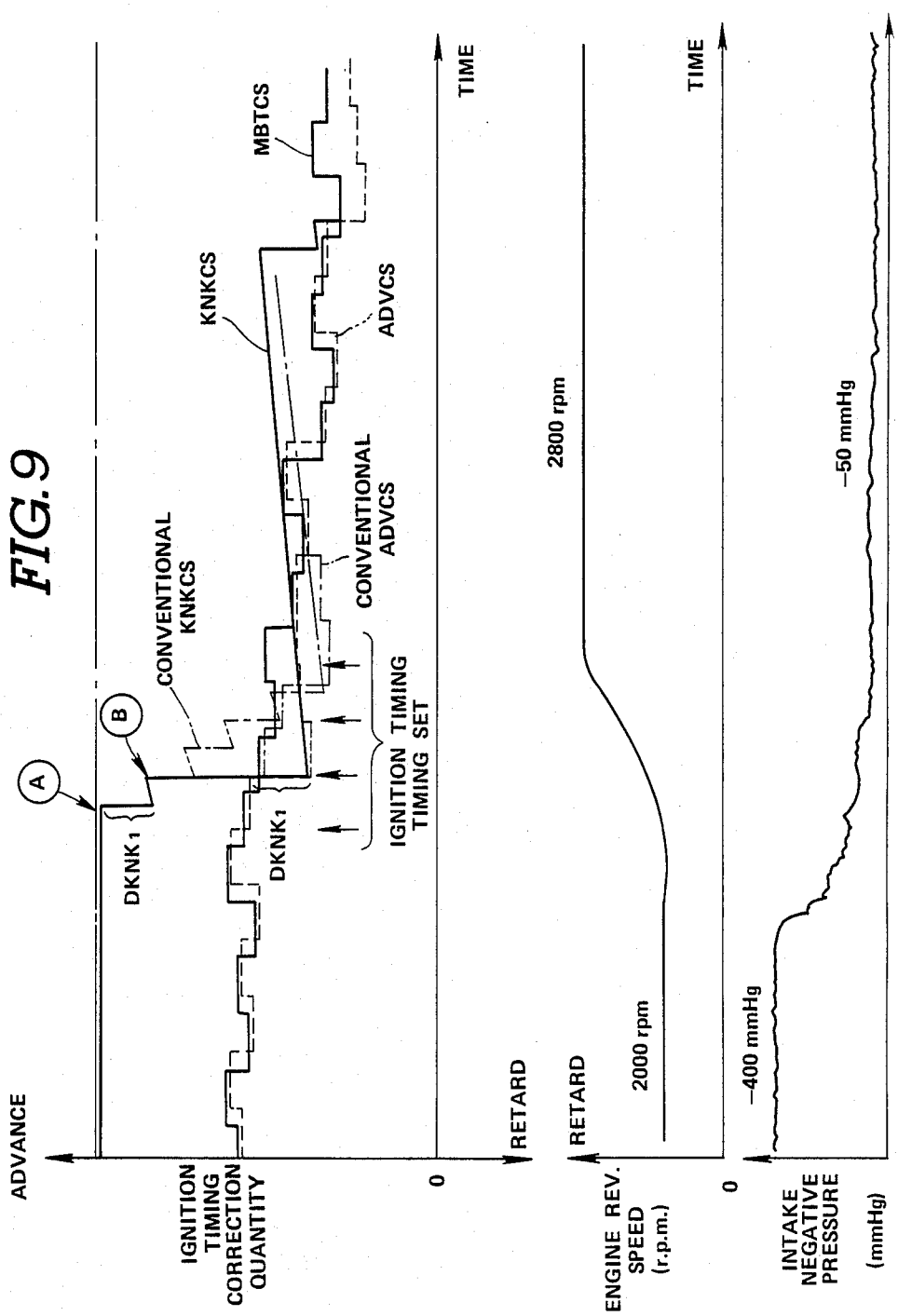
FIG. 9 is a characteristic graph representing movements of the correction quantity for preventing the recurrence of the knocking and MBT controlled correction quantity when the engine operating condition is varied.
Figure 10:
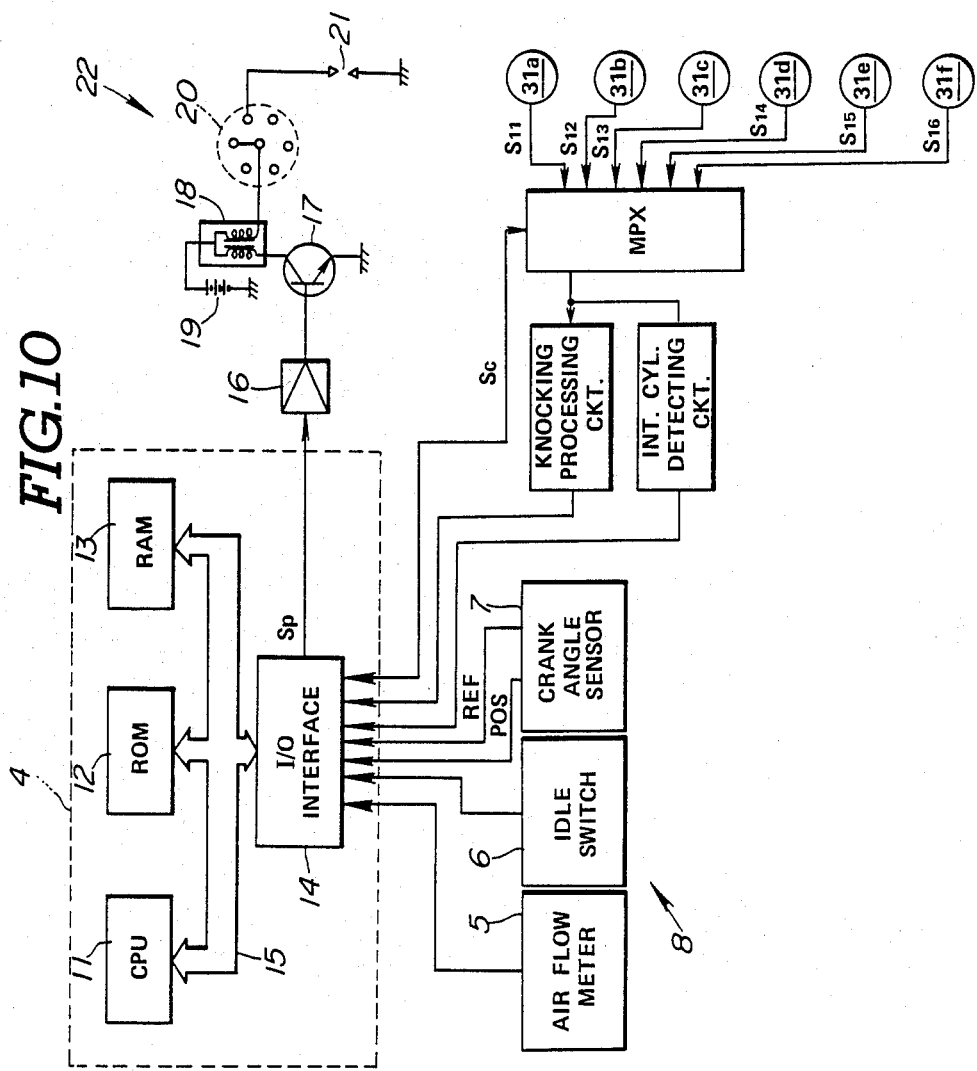
FIG. 10 is a schematic circuit diagram of the engine ignition timing controlling system in a second preferred embodiment according to the present invention.

FIG. 9 shows trajectories of the knock correction quantity KNKCS, MBT correction quantity MBTCS, and the ignition timing correction quantity ADVCS when the engine operating condition is changed from a condition denoted by a broken line of FIG. 5 (intake air negative pressure: −400 mmHg and the engine revolution speed: 2000 R.P.M.) to a dot-and-dash line of FIG. 7 (intake air negative pressure : −50 mmHg, engine revolution speed 2800 R.P.M.).

As shown in the broken line of FIG. 5, when the basic ignition timing TADV is placed at a point X of FIG. 4 when the intake air negative pressure is changed from −400 mmHg with the engine revolution speed 2000 R.P.M., the trajectories of the knock correction quantity KNKCS and MBT correction quantity MBTCS are shown in FIG. 7. In this case, since MBTCS<KNKCS (KNKCS at this time indicates the upper limit value), the MBTCS is used as the ignition timing correction quantity ADVCS. Therefore, the output of maximum engine torque becomes possible.

Figure 6:
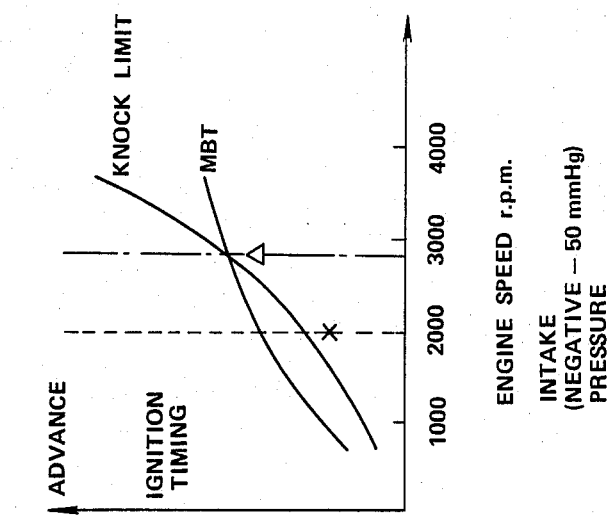
FIG. 6 is a characteristic graph representing a relationship between the MBT controlled ignition timing and knocking limit ignition timing when the intake negative pressure indicates −50 mmHg.

In addition, as shown by the broken line of FIG. 6, the trajectories of the knock correction value and MBT correction value when the basic ignition timing TADV is placed at a point X of FIG. 6 with the intake air negative pressure indicating −50 mmHg and the engine speed indicating 2000 R.P.M.. As described above, the KNKCS is placed at the upper limit, i.e., the advance angle limit point. Since the value of MBTCS is smaller, i.e., placed at a more retardation angle side, the MBT driving is achieved. During the change in the driving point, the knocking is detected at a point (A) and KNKCS is retarded by DKNK$_1$. Since, however, the retardation angle correction quantity due to the occurrence of knocking does not reflect on the ignition timing correction ADVCS, the control unit 4 replaces the previous ignition timing correction value ADVCS at a timing point (B) at which the ignition timing is set by a value of the previous ignition timing correction value ADVCS which is corrected toward the retardation angle side by DKNK$_1$, corrected toward the retardation angle side by DKNK$_1$ as KNKCS. If a value of either KNKCS or MBTCS which is placed toward the more retardation angle side is set as the ignition timing correction angle value ADVCS, the knocking control can effectively be achieved at the time of transient driving state and the initial stage of the knocking with the MBT driving. Thus, the the power performance can be improved.

FIGS. 10 to 16 show a second preferred embodiment of the engine ignition controlling system according to the present invention.

In this embodiment, the present invention is applied to each engine cylinder, i.e., to control ignition timing independently for each engine cylinder to increase the effects of the present invention.

The same reference numerals used in this embodiment designate corresponding elements used in the first preferred embodiment. The explanation of the corresponding elements of the same numerals will be omitted here.

It is noted the numerals 31a to 31f denote a plurality of internal cylinder pressure responsive sensors.

The internal cylinder pressure responsive sensors 31a to 31f convert internal cylinder pressures within the respective cylinders (in the second preferred embodiment, six cylinders) into electric charge by means of piezoelectric elements thereof. The electric charge signals $S_{11}$ to $S_{16}$ are supplied to a multiplexor (MPX) 32. A switching signal $S_c$ provided from the control unit 4 is supplied to the multiplexor 32. Whenever the switching signal $S_c$ is inputted to the multiplexor 32, the multiplexor 32 switches the output signals of the respective internal cylinder pressure responsive sensors 31a to 31f in the way as described below.

$$S_{11} - S_{15} - S_{13} - S_{16} - S_{12} - S_{14}$$

The switched output signals of the respective internal pressure responsive sensors are supplied to the knocking signal processing circuit 2 and internal cylinder pressure detecting circuit 3.

Figure 11:
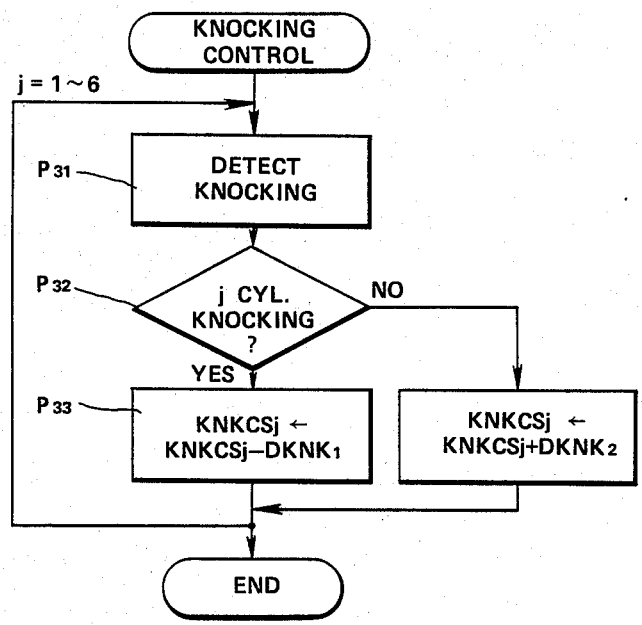
FIG. 11 is a processing flowchart of the knocking control executed in the system shown in FIG. 10.

FIG. 11 shows a processing flowchart of a program for preventing the recurrence of knocking control.

FIG. 11 corresponds to FIG. 2 of the first preferred embodiment.

In a step $P_{31}$, the knocking state of each engine cylinder is detected. In the step $P_{32}$, the control unit 4 determines the presence or absence of the knocking occurrence. If the presence of the engine knocking is determined, the routine goes to a step $P_{33}$ in which the knock correction quantity KNKCSj of any cylinder in which the knocking has occurred is corrected by the predetermined angle value $DKNK_1$ in accordance with the following equation (6). If no knocking has occurred, the routine goes to a step $P_{34}$ in which the knock correction quantity KNKCSj of any cylinder in which no occurrence of knocking is determined is corrected toward the more advance angle side by the predetermined angle $DKNK_2$ in accordance with the following equation (7).

$$KNKCS = KNKCSj' - DKNK_1 \qquad (6)$$

$$KNKCS = KNKCSj' + DKNK_2 \qquad (7)$$

In these equations, KNKCSj' denotes a previous value of the knock correction quantity at the corresponding cylinder.

Then, the above-described routine is ended.

Figure 12:
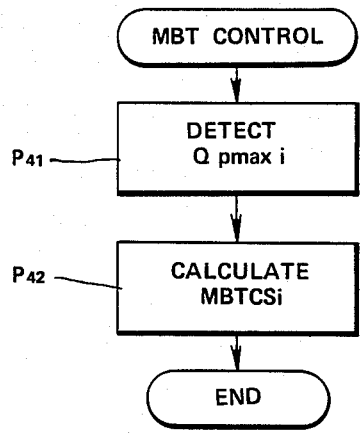
FIG. 12 is a processing flowchart of the MBT control executed in the system shown in FIG. 10.

FIG. 12 shows a processing flowchart of a program of the MBT control procedure.

FIG. 12 corresponds to FIG. 3 of the first preferred embodiment.

In a step $P_{41}$, an internal cylinder pressure maximum timing $\theta_{pmax}$ of each engine cylinder is detected. In a step $P_{42}$, the MBT correction quantity MBTCS is calculated in accordance with the following equation (8) and the present processing routine is ended.

$$MBTCS = MBTCSi' + K \, (\theta_{pmax} - \hat{\theta}) \qquad (8)$$

In the equation (8), MBTCSi' denotes a previous value of MBTCS, K denotes a constant number below one, and $\hat{\theta}$ denotes a target positional value in the MBT control.

FIG. 13 shows a flowchart of a program of the ignition timing control procedure.

FIG. 13 corresponds to FIG. 4 of the first preferred embodiment.

In a step $P_{51}$, the control unit 4 determines whether the knocking has occurred as a result of the previous ignition of the k cylinder. When the knocking has occurred, the routine goes to a step $P_{52}$ in which the control unit 4 compares the correction quantity KNKCSk of the knocking control in the k cylinder with the ignition timing correction quantity ADVCSk. If KNKCSk is placed at the advance angle side (KNKCSk>ADVCSk), the routine goes to a step $P_{53}$ in which KNKCSk is replaced with ADVCSk−DKNK$_1$. Furthermore, the routine goes to a step $P_{64}$, in which KNKSCl of the other cylinder (wherein, l:1 to 6, l≠k) are replaced with ADVCSk−DKNK$_1$.

Next, the routine goes to steps $P_{55}$ and $P_{56}$ in which the respective KNKCSk and MBTCSk are limited by the advance/retardation limit value. In a step $P_{57}$, the control unit 4 compares KNKCSk with MBTCSk. In either of steps $P_{58}$ or $P_{59}$, the ignition correction quantity ADVCSk is set at either KNKCSk or MBTCSk which is placed at more retardation angle side.

In a step $P_{51}$, (70°−ADVSET) is set in the register of the I/O interface 14 on the basis of this ADVSET. Then, the ignition signal $S_p$ is outputted to the k cylinder at a predetermined timing and the present processing is ended.

$$ADVSET = TASDV + ADVCSk \qquad (9)$$

In the equation (9), TADV; a basic ignition timing angle value.

Figure 14:
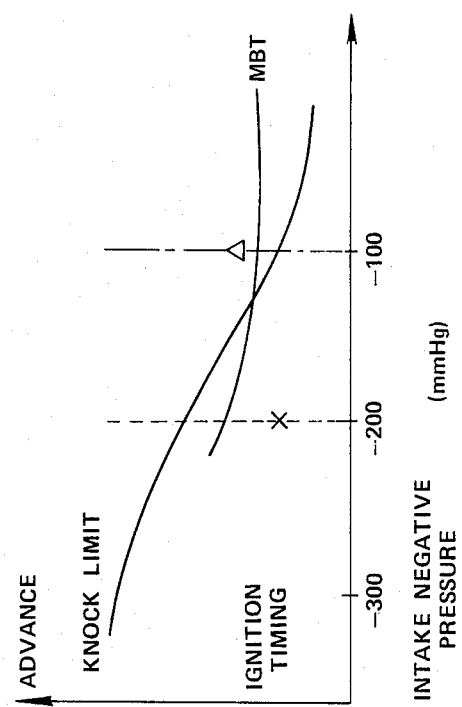
FIG. 14 is a characteristic graph representing a relationship between the MBT controlled ignition timing and knocking limit ignition timing when the intake negative pressure if changed with the engine revolution speed fixed at 2000 R.P.M..

FIG. 14 shows required values of the MBT ignition timing and the knock limit ignition timing when the engine revolution speed remains at 2000 R.P.M. and the intake air negative pressure is changed. The basic ignition timing when the intake air negative pressure is −200 mmHg is placed at a point X and when the intake air pressure is −100 mmHg, the basic ignition timing is placed at a point A.

Figure 15:
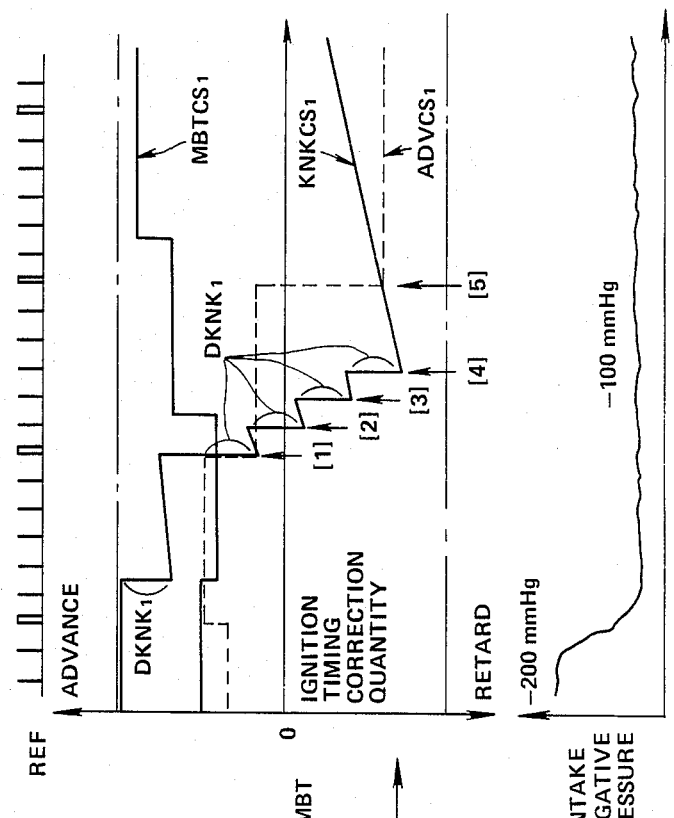
FIG. 15 is a characteristic graph for explaining an effect of the second preferred embodiment.

FIG. 15 shows a movement of the ignition timing correction quantity at the first engine cylinder #1 in the second preferred embodiment when the intake air negative pressure is changed from −200 mmHg to −100 mmHg with the engine revolution speed of 2000 R.P.M..

In FIG. 15, a point denoted by [1] indicates that the correction value of $KNKCS_1$ of the first cylinder #1 when the intake air negative pressure is changed and the occurrence of knocking is initially detected in the first cylinder is corrected toward the retardation angle side by $DKNK_1$ from the previous first cylinder ignition timing correction value $ADVCS_1$ (broken line) and set as the next ignition timing correction value.

Points [2], [3], and [4] indicate that the successive switchings of the correction values for the remaining three cylinders after the point [1] occur so that the correction quantity $KNKCS_1$ of the knock control in the first cylinder #1 is corrected toward the retardation angle side by $DKNK_1$ for each ignition timing set timing of the cylinders corresponding to the points [2], [3], and [4] and the correction quantity of the knocking control is sufficiently corrected at the set timing [5] of the first cylinder #1 at the next timing.

Hence, in the second preferred embodiment, the ignition timing can speedily and sufficiently be corrected toward the retardation angle side for the continuous knocking susceptible to occur at a time when the transient engine driving from the low-load stationary driving to the high-load driving occurs. Especially, at the time of the transient state, the knocking can speedily be suppressed. At the steadily engine driving state, the MBT engine driving without excessive advance angle exceeding the knock limit can be achieved so that the maximum torque of the engine can always be achieved. Consequently, the engine with no recurrence of knocking can be achieved.

The retardation angle correction method shown in the second preferred embodiment has an advantage that the speedy correction of the ignition timing toward the retardation angle side can be carried out according to the number of times the recurrence of knocking are generated when the engine operating condition is transferred from a low engine load driving region in which the MBT control is the main control to a high load driving region in which the knocking control is the main control.

If the method used in the second preferred embodiment is not applied, it takes a time to arrive at the required retardation angle correction quantity. During this time, the recurrence of knocking may be continued.

It is noted that although, in the second preferred embodiment, the retardation angle correction quantity to the other cylinders and the retardation angle correction quantity to its own cylinder have the same $DKNK_1$, both retardation angle correction quantities may have different values from each other.

As described hereinabove, in the engine ignition timing controlling system according to the present invention, the correction quantity with which the ignition timing is corrected toward the retardation angle side is selected as the ignition timing correction quantity from among the knock correction quantity and the MBT correction quantity and the basic ignition timing advance angle is corrected toward the retardation angle side by the predetermined value on the basis of a value of the ignition timing correction when the knock correction quantity is placed toward the more advance angle side than the ignition timing correction quantity. Therefore, the knocking at the initial stage of the knocking can speedily be eliminated. The MBT control can effectively be achieved in the range of no occurrence of knocking with prevention of the recurrence of knocking assured under all engine operating conditions. The maximum torque driving under each driving condition is made possible. In addition, the engine driveability at the time of transient operating condition and fuel consumption can be improved.

It will fully be appreciated by those skilled in the art that the foregoing description is made in terms of the preferred embodiments and various changes and modifications may be made without departing from the scope of the present invention which is to be defined by the appended claims.

What is claimed is:

1. A system for controlling an ignition timing for an internal combustion engine, comprising:
   (a) first means for detecting occurrence of engine knocking;
   (b) second means for detecting an internal pressure in an engine cylinder;
   (c) third means for detecting an engine operating condition;
   (d) third means for setting a basic ignition timing according to the engine operating condition;
   (e) fourth means for detecting a crankshaft angular displacement at which the internal cylinder pressure becomes maximum as a maximum internal cylinder timing on the basis of a detection result of the second means;
   (f) sixth means for calculating a knock correction quantity for correcting the instantaneous ignition timing so as to suppress the knocking at a predetermined level on the basis of a detection result of the first means;
   (g) seventh means for calculating an MBT correction quantity for correcting the instantaneous ignition timing so that the maximum internal cylinder pressure timing coincides with a target position at which a generation of engine output torque becomes maximum;
   (h) eighth means for selecting one of the knock and MBT correction quantities whose value is smaller than the other correction quantity as an ignition timing correction quantity;
   (i) ninth means for correcting the basic ignition timing on the basis of the instantaneous ignition timing correction quantity selected by the eighth means;
   (j) tenth means for comparing the instantaneous knock correction quantity with a previous ignition timing correction quantity and correcting the instantaneous knock correction quantity toward a retardation angle side by a predetermined value when a magnitude of the engine knocking exceeds the predetermined level and when the instantaneous knock correction quantity is larger than the previous ignition timing correction; and
   (h) eleventh means for determining the instantaneous ignition timing from the corrected basic ignition timing by the ninth means and igniting fuel supplied to the engine at the determined ignition timing.

2. A system as set forth in claim 1, which further comprises twelfth means for setting a lower limit and upper limit of the value of the knock correction quantity calculated by the sixth means and thirteenth means for setting a lower limit and upper limit of the value of the MBT correction quantity calculated by the seventh means.

3. A system as set forth in claim 2, wherein the lower limits of both knock and MBT correction quantities and the upper limits of both knock and MBT correction quantities have the same values, respectively.

4. A system as set forth claim 1, wherein the first means includes a pressure responsive sensor for sensing the internal pressure in a single engine cylinder.

5. A system as set forth in claim 1, wherein the first means includes a plurality of pressure responsive sensors for sensing the internal pressures in the plurality of engine cylinders.

6. A system as set forth in claim 5, wherein the first means detects the engine knocking occurrence for each cylinder.

7. A system as set forth in claim 6, wherein the sixth means calculates the instantaneous knock correction quantity toward the retardation angle side by the predetermined value when the engine knocking exceeding the predetermined level occurs in the corresponding cylinder.

8. A system as set forth in claim 7, wherein the sixth means calculates the knock correction quantity toward an advance angle side by another predetermined value when the magnitude of the engine knocking does not exceed the predetermined level.

9. A system as set forth in claim 8, wherein the tenth means corrects the instantaneous knock correction quantity toward the retardation angle side by the predetermined value when the magnitude of the engine knocking in any one of the cylinders exceeds the predetermined level and wherein the tenth means corrects the instantaneous knock correction quantities toward the retardation angle side in the same way as the one of the cylinders in which the magnitude of the engine knocking exceeds the predetermined level.

10. A system for controlling an ignition timing for an internal combustion engine comprising:
    (a) first means for detecting an occurrence of engine knocking;
    (b) second means for detecting an internal pressure in an engine cylinder of the engine;
    (c) third means for calculating a knock correction quantity for correcting the ignition timing so as to suppress the knocking at a predetermined level on the basis of a detection result of the first means;
    (d) fourth means for detecting a crank angle at which the internal pressure becomes maximum as the maximum internal pressure timing on the basis of a detection result of the second means;
    (e) fifth means for calculating an MBT correction quantity for correcting the ignition timing so that the maximum internal cylinder pressure timing coincides with a target position at which a generation of engine torque becomes maximum;

(f) sixth means for detecting an engine operating condition;

(g) seventh means for setting a basic ignition timing angle on the basis of the engine operating condition detected by the sixth means;

(h) eighth means for selecting one of the knock correction quantity and MBT correction quantity which is placed at a more retardation angle side as an ignition timing correction quantity;

(i) ninth means for correcting the basic timing angle according to the MBT correction quantity, comparing the ignition timing correction quantity selected by the eighth means with the knock correction quantity when the first means detects that the magnitude of the engine knocking exceeds the predetermined level, correcting the basic ignition timing on the basis of a value corrected toward the retardation angle side by a predetermined value when the knock correction quantity is placed at a more advance angle side than the correction quantity of the ignition timing, and correcting the basic ignition timing angle on the basis of the knock correction quantity when the knock correction quantity is not placed at the more advance angle side than the ignition timing correction quantity; and (j) tenth means for igniting fuel supplied to each engine cylinder at a timing determined by the ninth means.

11. A system for controlling an ignition timing for an internal combustion engine, comprising:

(a) first means for detecting an occurrence of engine knocking;

(b) second means for detecting an internal pressure in an engine cylinder of the engine;

(c) third means for detecting an engine operating condition;

(d) fourth means for setting a basic ignition timing according to the engine operating condition;

(e) fifth means for detecting a crankshaft angular displacement at which the internal cylinder pressure becomes maximum as a maximum internal cylinder timing on the basis of a detection result of the second means;

(f) sixth means for calculating a knock correction quantity for correcting the instantaneous ignition timing so as to suppress the knocking at a predetermined level on the basis of a detection result of the first means;

(g) seventh means for calculating an MBT correction quantity for correcting the instantaneous ignition timing so that the maximum internal cylinder pressure timing coincides with a target position at which a magnitude of the engine output torque becomes maximum;

(h) eighth means for selecting one of the knock and MBT correction quantities whose value is smaller than the other one as an ignition timing correction quantity;

(i) ninth means for correcting the basic ignition timing on the basis of the instantaneous ignition timing correction quantity selected by the eighth means; and (j) tenth means for igniting fuel supplied to the engine at a timing of the basic ignition timing corrected by the instantaneous ignition timing correction quantity corrected by the ninth means.

12. A method for controlling an ignition timing for an internal combustion engine, comprising the steps of:

(a) detecting an occurrence of engine knocking;

(b) detecting an internal pressure in an engine cylinder of the engine;

(c) detecting an engine operating condition;

(d) setting a basic ignition timing according to the engine operating condition;

(e) detecting a crankshaft angular displacement at which the internal cylinder pressure becomes maximum as a maximum internal cylinder timing on the basis of the detection result in the step (b);

(f) calculating a knock correction quantity for correcting the instantaneous ignition timing so as to suppress the engine knocking at a predetermined level on the basis of a detection result of the step (a);

(g) calculating an MBT correction quantity for correcting the instantaneous ignition timing so that the maximum internal cylinder pressure timing coincides with a target position at which a magnitude of an engine output torque becomes maximum;

(h) selecting one of both knock and MBT correction quantities whose value is smaller than the other one as an ignition timing correction quantity;

(i) correcting the basic ignition timing on the basis of the instantaneous ignition timing correction quantity selected in the step (h);

(j) comparing the instantaneous knock correction quantity with a previous ignition timing correction quantity;

(k) correcting the instantaneous knock correction quantity toward a retardation angle side by a predetermined value when the magnitude of the engine knocking exceeds the predetermined level and when the instantaneous knock correction quantity is larger than the previous ignition timing correction quantity; and (l) determining the instantaneous ignition timing from the corrected basic ignition timing carried out in the step (i) and igniting fuel supplied to the engine at the determined ignition timing.

* * * * *